H. MOON.

TRANSPLANTER.

No. 11,305. Reissued Feb. 7, 1893.

ON LINE 6-6

Witnesses,

Sidney R. Hollingsworth

B. W. Miller.

Inventor:

Hiram Moon by his attorneys,

Baldwin, Davidson & Wight.

THE NORRIS PETERS CO., PHOTO-LITHO., WASHINGTON, D. C.

UNITED STATES PATENT OFFICE.

HIRAM MOON, OF RED CREEK, ASSIGNOR OF ONE-HALF TO JOHN P. CROWELL, OF WESTBURY, NEW YORK; PRUDENCE C. MOON ADMINISTRATRIX OF SAID HIRAM MOON, DECEASED.

TRANSPLANTER.

SPECIFICATION forming part of Reissued Letters Patent No. 11,305, dated February 7, 1893.

Original No. 482,314, dated September 6, 1892. Application for reissue filed November 4, 1892. Serial No. 451,001.

*To all whom it may concern:*

Be it known that I, HIRAM MOON, a citizen of the United States, residing at Red Creek, in the county of Wayne and State of New York, have invented certain new and useful Improvements in Transplanters, of which the following, taken in connection with the accompanying drawings, is a full, clear, and exact description.

My invention more especially relates to transplanters of the class adapted to be carried and manipulated by the operator, and its object is the production of such an implement especially adapted to receive and grip, grasp, or properly hold a plant between its points or blades; to insert the plant into a hole made in the ground by these blades; to withdraw the blades, and pack the soil properly around the plant, and remove the implement without disturbing the packing or plant. These desiderata I attain by certain novel combinations and organizations of instrumentalities hereinafter set forth and particularly designated in the claims at the close of this specification.

In order to carry out the objects of my invention, I provide a suitable frame having sections united by a pivot or hinge-connection, substantially parallel to the line of movement or traverse of the implement, while being inserted into or withdrawn from the ground. These frame-sections consequently swing or move laterally to this line of movement in opening or closing. A spring may be used to normally close them. Points or blades traverse these frame-sections longitudinally being actuated by handles adapted to slide endwise on the frame in suitable guides. The blades thus partake both of the longitudinal reciprocation of the handles, and the lateral swinging of the frame-sections through which they pass. The blade and handle of each set move together, separately from or independently of the other set, and their retraction is facilitated by suitable springs. Gripping devices on the frame are adapted to receive the upper part of the plant, and hold it while being set, and a foot-piece adapted to aid in holding down the implement, and a packing-block adapted to press the earth around the plant are carried by the frame at its lower end.

Figure 1:
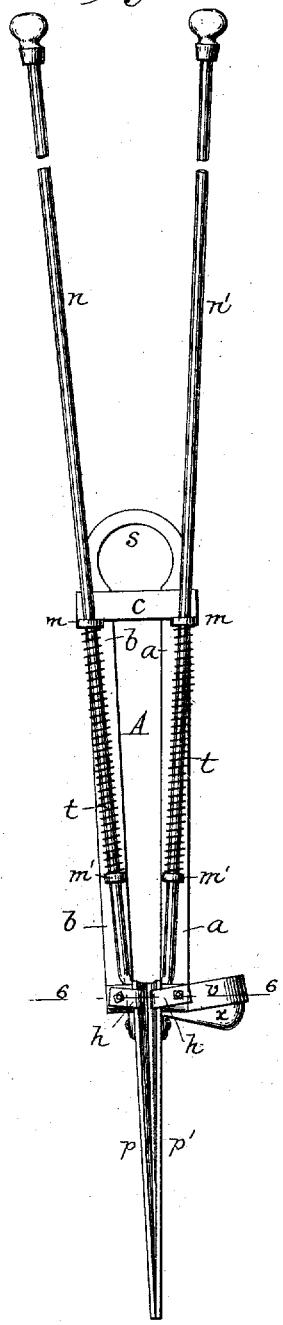
Figure 2:
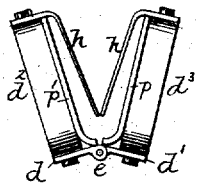
Figure 3:
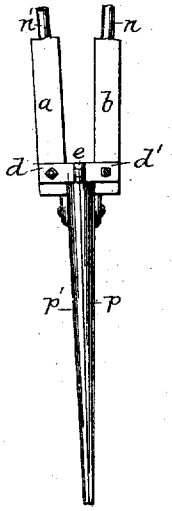
Figure 4:
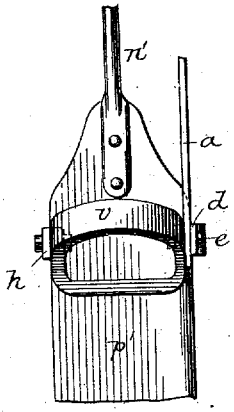
Figure 5:
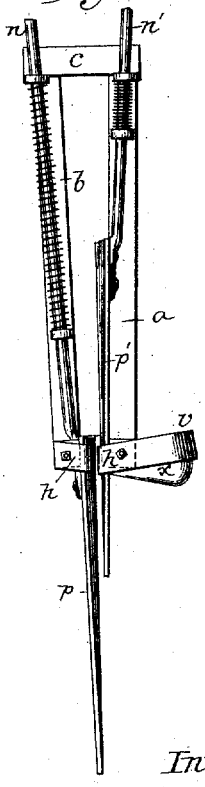

In the accompanying drawings—Figure 1 is a front elevation (with the handles partly broken away) of my improved transplanter, showing the points or blades as protruded to their greatest extent, and closed as in grasping a plant; Fig. 2, a bottom plan or end elevation, showing the frame-sections, blades, and gripping-springs opened to receive a plant, (the packer and foot-piece being omitted;) Fig. 3, a rear elevation of the lower portion of the implement, with the blades protruded and closed, as in Fig. 1 (the packer and foot-piece being omitted); Fig. 4, an elevation of the left side of portions of the frame, the foot-piece, and one of the points or blades; Fig. 5, a front elevation of the lower portion of the implement, with one blade protruded, and the other retracted, and Fig. 6, a transverse section on the line 6—6 of Fig. 1, looking downward.

That part of the implement next the operator standing behind and facing it, I term the rear; the opposite part, the front. That side on the left of the operator, standing as abovementioned, I term the left side; the opposite side, the right.

Figure 6:
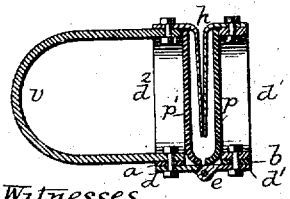

The drawings show a frame A, comprising two longitudinal bars *a*, *b*, united rigidly at their upper ends by a cross-bar *c*. Bars *d*, *d'*, respectively connected with the longitudinal frame-bars *a*, *b*, at their lower ends, are united by a hinge *e*. As shown in Figs. 2 and 6, these bars are secured to, or form part of other bars $d^2$, $d^3$, thus constituting what I call frame-sections, united at their back by the central hinge *e*, which hinge permits the sections to swing or open and close laterally to the line of movement of the blades. The frame-bars *a*, *b*, are shown as flat springs, which tend normally to close the frame-sections. Gripping devices or springs *h*, mounted on these frame-sections, serve, when closed, to grasp the upper part of a plant inserted therein. These springs are shown as extending between the frame-sections, and between the blades. Points or blades *p*, *p'*, are adapted to slide freely endwise through these frame-sections. Figs. 4 and 6 show them as sliding close to the inner sides of the frame-sections, between the hinged-bars *d*, *d'*, and gripping-springs *h*, the frame-sections thus constituting guideways for them.

Fig. 6 shows the blades with their front edges close to the front edges of the gripping-springs *h*, and their rear edges bent inwardly toward each other, more or less, so as to create a sort of box to receive and catch the plant, and prevent its falling through between the blades. Handles *n*, *n'*, connected with the blades, pass freely through guides *m*, on the frame, and carry collars or stop-rings *m'*. Retracting-springs *t*, may be mounted on these handles between these collars and guides to aid in retracting the blades. The bars *a*, *b*, are united by the curved central portion *s*, but, as the cross-bar *c*, connects them, the part *s* may be omitted. A foot-piece or step *v*, is carried by the frame. Fig. 6 shows it as connected with one of the frame-sections. One of the inner ends of this foot-piece may form one of the gripping-springs. A packing-block *x*, secured to or forming the lower side of this foot-piece or step *v*, serves to pack the earth around the plant after the blades are withdrawn from the ground. This block is preferably made to slant downward and outward—see Fig. 5—in order to produce more of an inward wedging of the earth toward the plant.

In using the implement, the upper ends of the handles are squeezed together, or pressed inwardly toward each other, thus swinging the frame-sections outwardly and laterally upon their hinge *e*, and correspondingly opening the blades, by separating their front edges as in Fig. 2. The plant is then inserted between the blades and the gripping-devices, with the stem between the springs, and the root between the blades. The operator then releases his grasp upon the handles, and the blades and gripping-springs automatically close upon the plant and hold it. These gripping-springs are of light tension, so as not to damage the plant. After thus inclosing the plant, the blades are pushed into the ground to the desired depth; the operator places one foot on the step or foot-piece *v*, and then, either with or without slightly opening the blades, pulls up first one and then the other of them, leaving the plant in the soil. The implement is then tilted slightly, and the operator, by pressing with his foot on the step *v*, packs the soil by means of the packer *x*. While the handles are still withdrawn, they are pressed together at their upper ends, opening the frame-sections, and permitting the operator to withdraw the implement from the plant laterally. The retracting-springs *t*, serve to restore the normal relation of the frame and blades.

I do not limit myself to the precise form of any of the parts shown; the blades need not have their edges bent, and the form of the frame, frame-sections and gripping devices may be changed.

Having thus fully described the organization and operation of my improved transplanter, what I claim as of my own invention, and desire to secure by Letters Patent is—

1. The combination, substantially as hereinbefore set forth, of transplanter frame-sections; hinge-connections on which they are adapted to swing laterally, in opening and closing, and blades adapted to traverse these frame-sections longitudinally, as well as to partake of their swinging movements.

2. The combination, substantially as hereinbefore set forth, of transplanter frame-sections; hinge-connections on which they are adapted to swing laterally, in opening and closing; blades adapted to traverse these frame-sections longitudinally, and gripping-devices carried by these frame-sections.

3. The combination, substantially as hereinbefore set forth, of transplanter frame-sections; hinge-connections on which they are adapted to swing laterally, and gripping-springs secured to the open edge of the frame-sections, and extending inwardly between the blades.

4. The combination, substantially as hereinbefore set forth, of a transplanter-frame; sections carried thereby; hinge-connections on which they are adapted to swing laterally, in opening and closing; blades adapted to traverse these frame-sections longitudinally, and independently said frame being adapted to automatically close the frame-sections.

5. The combination, substantially as hereinbefore set forth, of the frame-sections; hinge-connections on which they are adapted to swing laterally, in opening and closing; blades adapted to traverse these frame-sections longitudinally and independently; blade-handles, guides on the frame adapted to be traversed by these handles, and a spring tending to keep the blades closed.

6. The combination, substantially as hereinbefore set forth, of a transplanter-frame; sections carried thereby; hinge-connections uniting them at one end; handles adapted to slide on the frame, and blades adapted to be opened by squeezing the handles together.

7. The combination, substantially as hereinbefore set forth, of the spring frame-bars hinged together at one end; handles adapted to slide thereon, and blades thereon adapted to be opened by squeezing the handles together.

8. The combination, substantially as hereinbefore set forth, of a transplanter-frame; sections carried thereby; hinge-connections on which they are adapted to swing laterally, in opening and closing; blades adapted to traverse these sections longitudinally, and a step or foot-piece carried by one of the frame-sections.

9. The combination, substantially as hereinbefore set forth, of transplanter frame-sections, hinged together as described, to open and close laterally; blades adapted to traverse the frame-sections longitudinally, as well as to partake of their lateral or swinging movement, and a packer carried by the frame, for the purpose specified.

10. The hereinbefore described transplanter consisting of the combination of a frame; sections carried thereby; hinge-connections on which they are adapted to swing laterally, in opening and closing; blades adapted to traverse these frame-sections longitudinally; retracting-springs adapted to retract the blades, and gripping-springs adapted to hold the plant.

HIRAM MOON.

Witnesses:
T. M. COVERT,
JOHN H. SMITH.